(12) United States Patent
Panchbudhe et al.

(10) Patent No.: US 8,130,913 B1
(45) Date of Patent: Mar. 6, 2012

(54) METHOD AND APPARATUS FOR ARCHIVING CALLS TERMINATING AT A COMPUTER

(75) Inventors: Ankur Panchbudhe, Pune (IN); Angshuman Bezbaruah, Pune (IN)

(73) Assignee: Symantec Corporation, Mountain View, CA (US)

( * ) Notice: Subject to any disclaimer, the term of this patent is extended or adjusted under 35 U.S.C. 154(b) by 1345 days.

(21) Appl. No.: 11/731,321

(22) Filed: Mar. 30, 2007

(51) Int. Cl.
  *H04M 1/64* (2006.01)
(52) U.S. Cl. .. 379/68; 379/85; 379/112.01; 379/121.05; 379/133; 379/373.04
(58) Field of Classification Search .................... 379/68, 379/85, 88.26, 112.01, 121.05, 133, 266.1; 455/18
  See application file for complete search history.

(56) References Cited

U.S. PATENT DOCUMENTS

| | | | | |
|---|---|---|---|---|
| 5,590,171 A | * | 12/1996 | Howe et al. | 379/33 |
| 5,923,746 A | * | 7/1999 | Baker et al. | 379/265.02 |
| 5,995,824 A | * | 11/1999 | Whitfield | 455/412.1 |
| 6,072,860 A | * | 6/2000 | Kek et al. | 379/88.25 |
| 6,222,909 B1 | * | 4/2001 | Qua et al. | 379/88.22 |
| 6,529,602 B1 | * | 3/2003 | Walker et al. | 380/283 |
| 7,620,389 B2 | * | 11/2009 | Kallio et al. | 455/414.1 |
| 2004/0131161 A1 | * | 7/2004 | Schwartz et al. | 379/68 |
| 2005/0286473 A1 | * | 12/2005 | Stubbs | 370/331 |

* cited by examiner

*Primary Examiner* — Joseph J Nguyen
(74) *Attorney, Agent, or Firm* — Campbell Stephenson LLP (57) ABSTRACT

A method and apparatus for archiving a call terminating at a client device are provided. In an example, a command or packet associated with a protocol for setting up the call is intercepted. In response to the interception, the call is associated with a call ID. An information associated with the call is retrievably stored in an archive using the call ID. The information is at least partially determined via replicating at least one of a device input signal associated with an outbound call content and a device output signal associated with an inbound call content. In an example, a call capture agent resident on the client device is controlled by a call archive administration service, and performs the replication by forming respective loopbacks corresponding to the at least one of the device input signal and the device output signal. In an example, the respective loopbacks are virtual loopbacks.

21 Claims, 7 Drawing Sheets

METHOD AND APPARATUS FOR ARCHIVING CALLS TERMINATING AT A COMPUTER

BACKGROUND OF THE INVENTION

1. Field of the Invention

The present invention generally relates to computer networks and, more particularly, to methods and apparatus for archiving information associated with calls terminating within an enterprise.

2. Description of the Background Art

Voice calls having at least one termination at a computer or computer-related device, such as PC-to-PC or PC-to-phone voice calls, are fast becoming mainstream options, particularly for business communications. This is evident by the popularity of software such as Skype™, and the focus of companies such as Yahoo, Microsoft, and Google on enabling voice communication using their "chat" software (e.g., Yahoo! Messenger with Voice™, Google Talk™, etc.). It is also evident that enterprises must consider how to address this trend in terms of how best to record or archive such calls (e.g., for compliance, analysis, etc.).

Some enterprises have adapted the so-called 'man-in-the-middle' approach traditionally used for recording phone-to-phone calls (e.g., TelRex™, CallRex™) and also for instant messaging (e.g., Symantec IMLogic IMManager™). The voice recording is done by tapping the wire (in hardware or software), or on a switch through which the call passes, or by an entity that resides in the middle and acts as a call forwarder. Unfortunately, this approach does not necessarily translate effectively to calls having at least one computer device termination. For example, the software used for implementing such calls at the device termination can be quite sophisticated, such as in terms of protocol, routing, and information 'hiding'. This makes smooth interaction with the middle-residing entity that much more difficult to achieve. Moreover, such device termination software typically comes with in-built call encryption (e.g., Skype™). In most cases, this would render useless any attempt to record calls using a middle-residing entity. Having a recording entity in the middle also tends to hamper performance, since such calls typically (e.g., on exception being conference calls) tend to be peer-to-peer. There is a need, therefore, to address the above-mentioned problems.

SUMMARY OF THE INVENTION

A method and apparatus for archiving a call terminating at a client device are provided. In accordance with one or more embodiments, a command associated with a protocol for setting up the call is intercepted. In response to the interception, the call is associated with a call identifier. An information associated with the call is retrievably stored in an archive using the call identifier. The information is at least partially determined via replicating at least one of a device input signal associated with an outbound call content and a device output signal associated with an inbound call content. In accordance with one or more exemplary embodiments, a call capture agent resident on the client device is controlled by a call archive administration service, and performs the replication by forming respective loopbacks corresponding to the at least one of the device input signal and the device output signal. In accordance with one or more exemplary embodiments, the respective loopbacks are virtual loopbacks.

BRIEF DESCRIPTION OF THE DRAWINGS

So that the manner in which the recited features of the present invention can be understood in detail, a more particular description of the invention, briefly summarized below, can be had by reference to embodiments, some of which are illustrated in the appended drawings. It is to be noted, however, that the appended drawings illustrate only some of the embodiments of this invention and are therefore not to be considered limiting of its scope, for the invention can admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" can in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
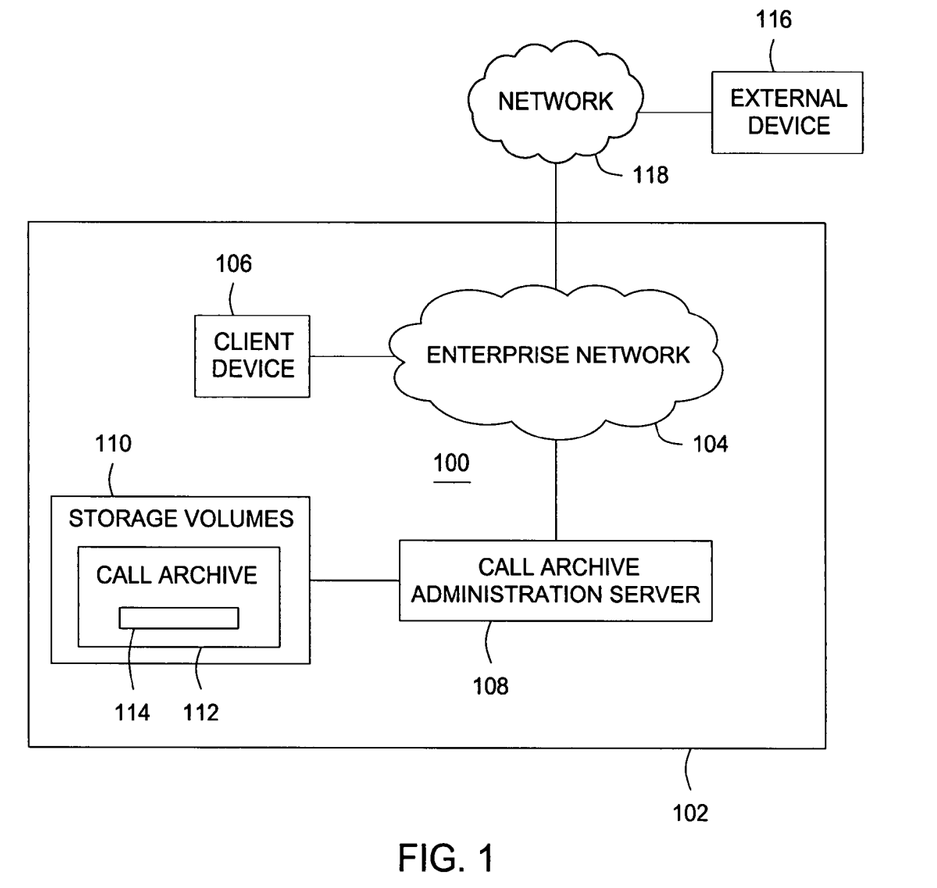
FIG. 1 is a block diagram depicting an exemplary embodiment of a computer network in accordance with one or more aspects of the invention.

FIG. 1 is a block diagram depicting an exemplary embodiment of a computer network 100 in accordance with one or more aspects of the invention. The computer network 100 may be located in an enterprise 102 and may include an enterprise network 104. The enterprise network 104 comprises a communication system that connects computer systems by wire, cable, fiber optic, and/or wireless links facilitated by various types of well-known network elements, such as hubs, switches, routers, and the like. The network 104 may employ various well-known protocols to communicate information.

The computer network 100 further includes an enterprise client device 106 and a call archive administration server 108 coupled to each other via the enterprise network 104. The call archive administration server 108 further hosts a call archive administration service for archiving calls terminating at client devices, such as the device 106. In turn, the device 106 includes a call capture agent resident on the device 106 for capturing calls terminating at the device 106 for archiving as they occur. The call archive administration server 108 is further configured to manage one or more storage volumes 110. Each of the one or more storage volumes 110 may comprise any type of block-backed storage areas and may be implemented using any type of storage system or storage systems, such as a disk drive system, tape drive system, or a combination thereof. A disk drive system may include, for example, one or more storage disks, e.g., an array of storage disks or a redundant array of storage disks.

The storage volumes 110 store a call archive 112 for storing information with regard to calls occurring in the enterprise 102. Such information with regard to such calls is lodged in the call archive 112 in the form of a plurality of archive entries 114, each of which contains information about a particular call. The call archive administration server 108 is configured to communicate with the call archive 112, including updating the call archive 112 to cause corresponding archive entries 114 to reflect new information relating to particular calls, as will be described in greater detail hereinafter.

Calls terminating at the device 106 can include one or more other internal terminations (not shown) (e.g., within the enterprise 102) and/or one or more outside terminations (e.g., external to the enterprise 102), any or each of which can comprise an additional device termination. For example, a call terminating at the device 106 can have an outside termination at an external device 116 that connects with the enterprise network 104 via a network 118. The network 118 can comprise any suitable network for permitting external calls to connect to the enterprise 102, including one or more publicly-accessible telecommunications networks such as the World Wide Web in particular, or the Internet in general. Other means for connecting to the enterprise network 104 for purposes of terminating a call at the device 106 are also possible.

Figure 2:
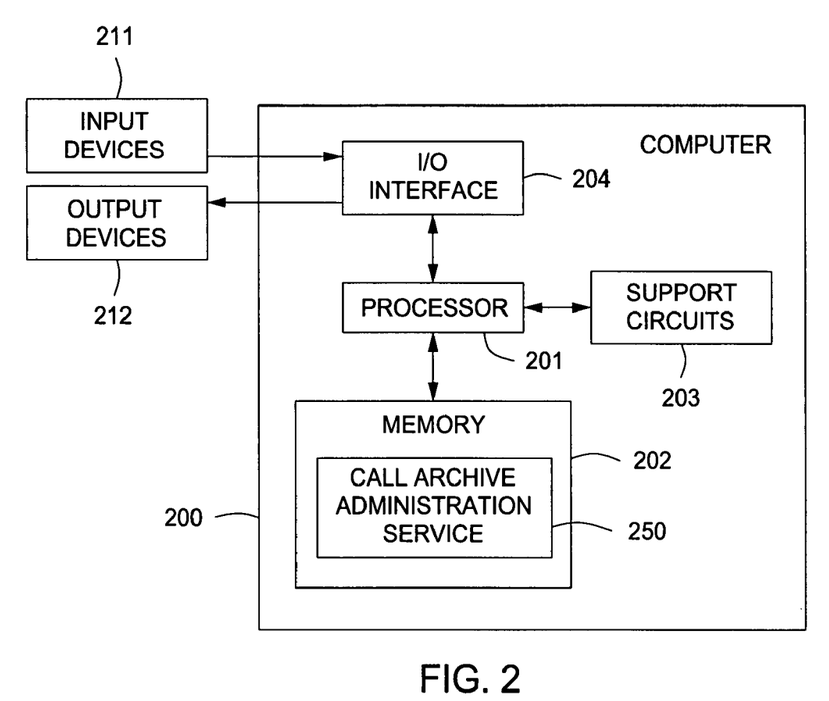
FIG. 2 is a block diagram depicting an exemplary embodiment of a computer system in accordance with one or more aspects of the invention.

FIG. 2 is a block diagram depicting an exemplary embodiment of a computer system 200 in accordance with one or more aspects of the invention. The computer system 200 may be used to implement the call archive administration server 108 in FIG. 1. The computer system 200 includes a processor 201, a memory 202, various support circuits 203, and an I/O interface 204. The processor 201 may include one or more microprocessors known in the art. The support circuits 203 for the processor 201 include conventional cache, power supplies, clock circuits, data registers, I/O interfaces, and the like. The I/O interface 204 may be directly coupled to the memory 202 or coupled through the processor 201. The I/O interface 204 may also be configured for communication with a network, with various storage devices, as well as other types of input 211 and output devices 212 (e.g., mouse, keyboard, display, etc.). The memory 202 stores processor-executable instructions and/or data that may be executed by and/or used by the processor 201. These processor-executable instructions may comprise hardware, firmware, software, and the like, or some combination thereof.

Modules having processor-executable instructions that are stored in the memory 202 may include a call archive administration service 250. The call archive administration service 250 is configured to execute one or more call archive administration processes, as described below. The computer system 200 may be programmed with an operating system, which may be OS/2, Java Virtual Machine, Linux, Solaris, Unix, Windows, Windows95, Windows98, Windows NT, Windows2000, WindowsME, WindowsXP, Windows Server, Symbian OS, Windows CE, Windows Vista, and MacOS, among other known platforms. At least a portion of an operating system may be disposed in the memory 202. The memory 202 may include one or more of the following: random access memory, read only memory, magneto-resistive read/write memory, optical read/write memory, cache memory, magnetic read/write memory, and the like, as well as signal-bearing media as described below.

Figure 3:
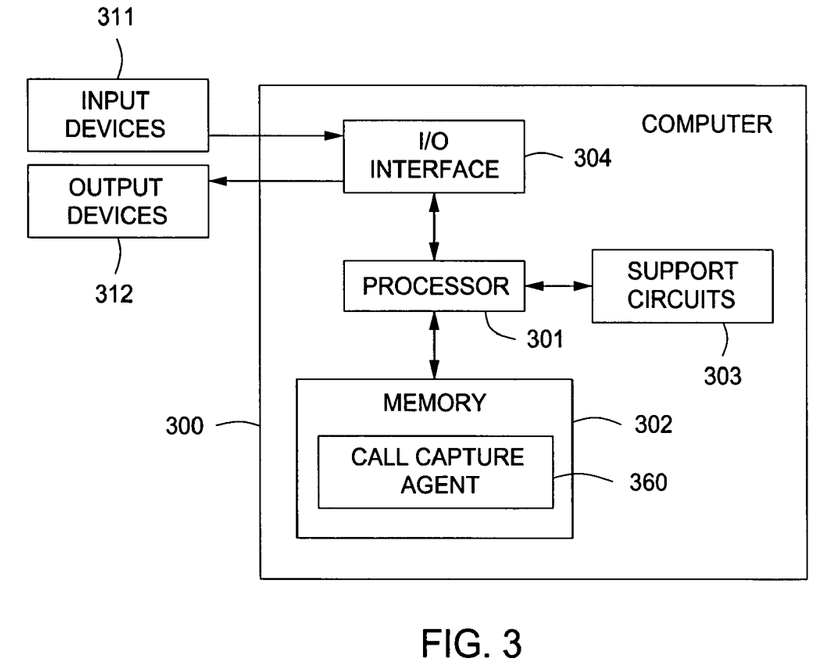
FIG. 3 is a block diagram depicting an exemplary embodiment of another computer system in accordance with one or more aspects of the invention.

FIG. 3 is a block diagram depicting an exemplary embodiment of a computer system 300 in accordance with one or more aspects of the invention. The computer system 300 may be used to implement the device 106 in FIG. 1. The computer system 300 includes a processor 301, a memory 302, various support circuits 303, and an I/O interface 304. The processor 301 may include one or more microprocessors known in the art. The support circuits 303 for the processor 301 include conventional cache, power supplies, clock circuits, data registers, I/O interfaces, and the like. The I/O interface 304 may be directly coupled to the memory 302 or coupled through the processor 301. The I/O interface 304 may also be configured for communication with a network, with various storage devices, as well as other types of input 311 and output devices 312 (e.g., mouse, keyboard, display, microphone, speaker, etc.). The memory 302 stores processor-executable instructions and/or data that may be executed by and/or used by the processor 301. These processor-executable instructions may comprise hardware, firmware, software, and the like, or some combination thereof.

Modules having processor-executable instructions that are stored in the memory 302 may include a call capture agent 360. The call capture agent 360 is configured to execute a process for capturing calls terminating at the device 106 for archiving as they occur. The computer system 300 may be programmed with an operating system, which may be OS/2, Java Virtual Machine, Linux, Solaris, Unix, Windows, Windows95, Windows98, Windows NT, Windows2000, WindowsME, WindowsXP, Windows Server, Symbian OS, Windows CE, Windows Vista, and MacOS, among other known platforms. At least a portion of an operating system may be disposed in the memory 302. The memory 302 may include one or more of the following: random access memory, read only memory, magneto-resistive read/write memory, optical read/write memory, cache memory, magnetic read/write memory, and the like, as well as signal-bearing media as described below.

Figure 6:
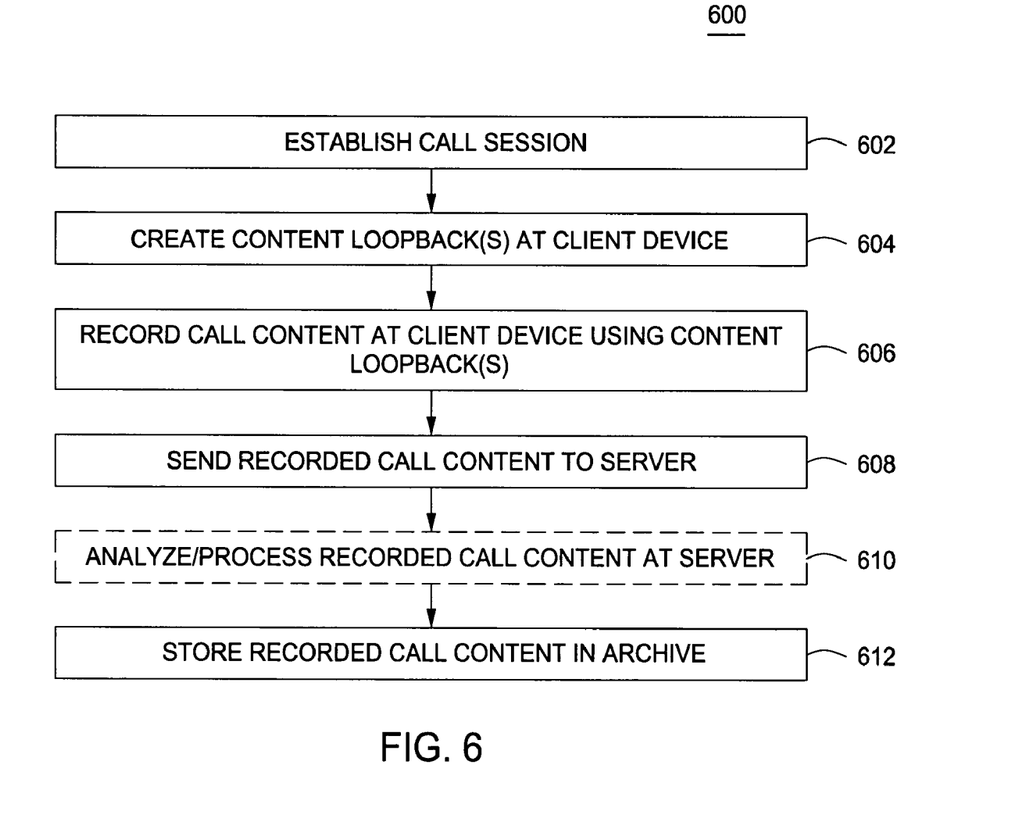
FIG. 6 is a flow diagram depicting an exemplary embodiment of a method for archiving a call in accordance with one or more aspects of the invention.

FIG. 6 is a flow diagram depicting an exemplary embodiment of a method 600 for archiving a call in accordance with one or more aspects of the invention. The method 600 begins at step 602, where a call session is established. The call session may be established using any type of protocol known in the art, such as Session Initiation Protocol (SIP). The call session is established between a client device and an external device or system. The client device is configured to generate outbound call content and receive inbound call content. The inbound and outbound content may comprise audio, video, data, or any combination thereof.

At step 604, one or more content loopback(s) are created in the client device. A "loopback" allows a signal generated in the client device to be captured (i.e., recorded). For example, the client device may create an audio loopback for capturing one or more audio signals therein. The audio signals may include a microphone signal (outbound audio content) and/or a signal for driving speakers (inbound audio content). The client device may create similar loopbacks for video and/or data. The loopbacks may be "virtual" in that they are created using software in the client device. At step 606, call content is recorded at the client device using the loopback(s). By using loopbacks, the outbound call content is captured before being processed by the call client, and inbound content is captured after being processed by the call client. As such, data formatted using the call protocol does not have to be analyzed and processed to extract the underlying call content. As described above, such formatting may include encryption or other types of information hiding mechanism rendering it difficult if not impossible to extract the call content from this data.

At step 608, the recorded call content is sent to a server from the client device. Notably, the steps 606 and 608 may be performed contemporaneously in that recorded content may be periodically sent to the server during the call (e.g., after a predefined amount of data has been captured) or continuously sent to the server during the call (e.g., via one or more content streams). Alternatively, the recorded call content may be sent to the server after the call has ended and all of the associated content has been captured. At optional step 610, the server may analyze otherwise process the recorded call content. For example, the server may perform speech-to-text conversion on an audio portion of the content. The server may perform indexing of such converted speech for search purposes. In another example, the server may perform phonetic indexing or mining on an audio portion of the content. The server may generate or otherwise extract meta data associated with the recorded call content. At step 612, the recorded call content is stored in an archive.

Figure 4:
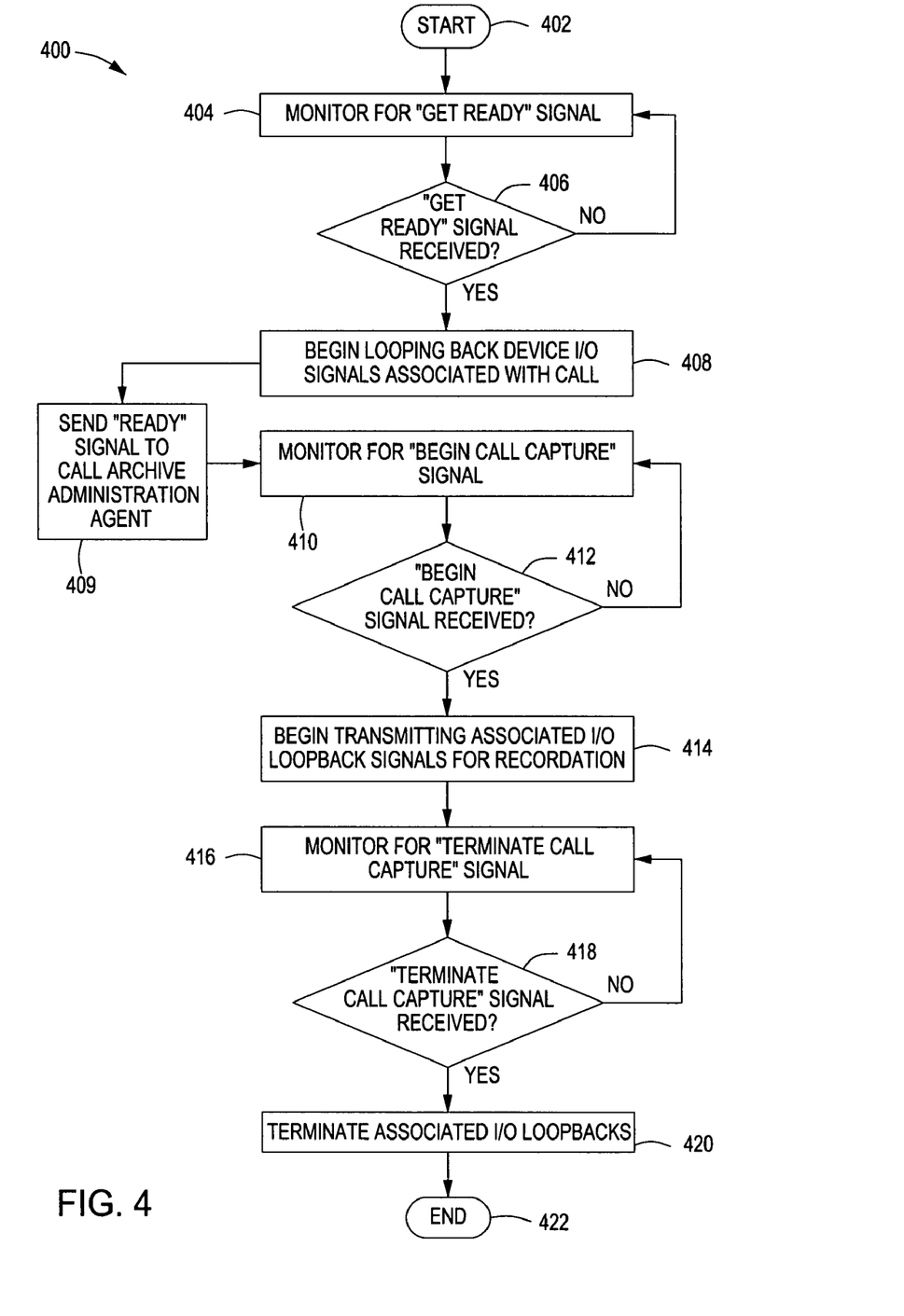
FIG. 4 is a flow diagram depicting an exemplary embodiment of a method for capturing a call for archiving in accordance with one or more aspects of the invention.

FIG. 4 is a flow diagram depicting an exemplary embodiment of a method 400 for capturing calls for archiving in accordance with one or more aspects of the invention. The method 400 may be performed by the call capture agent 360 of FIG. 3 to capture calls terminating at the computer system 300 and the enterprise device 106 as they occur for archiving by the call archive administration server 108. As discussed more fully below, the method 400 may be used and/or altered to capture calls other than, or in addition to, voice calls, e.g., calls including not only a voice or audio content component (e.g., such as may be associated with a speaker or speaker jack output signal or a microphone or microphone jack signal), but also an image or video content component (e.g., such as may be associated with a monitor output signal or a camera input signal). Calls including additional analog or digital content components, including components corresponding to digital information passed between call participants or considered by the call participants during the course of the call, such as slides, presentations, or documents displayed on a monitor or television, can also be captured. Other call components can also, or alternatively, be captured by the method 400. Also, because the method 400 captures call content at either one of its source point or its end point (e.g., associated with such components as speakers, microphones, handsets or headsets, computer monitors, etc.), the above described difficulties associated with using the so called man-in-the-middle approach (e.g., related to protocol, routing, information 'hiding', built-in encryption, performance) for recording PC-to-PC or PC-to-phone calls can largely be avoided.

The method 400 begins at a step 402, and proceeds to a step 404, the call capture agent 360 monitors for an initialization signal from the call archive administration service 250. The initialization signal commands the call capture agent 360 initialize for capturing a call terminating at the device 106. At step 406, a determination is made whether such an initialization signal has been received from the call archive administration service 250. If not, the method 400 returns to the step 404. If so, the method 400 proceeds to step 408. Notably, an initialization signal may be received because a protocol has been initiated for setting up a call having a termination at the device 106. At step 408, appropriate preparations are made to begin capturing the pending call. Such preparations can include forming (e.g., in advance of completion of the related call setup protocol) respective loopbacks for tapping or replicating at least one of a device input signal and a device output signal passing within the computer system 300 (e.g., such as will shortly be associated with respective outbound and inbound call content). Such I/O signals can include audio signals originating at a microphone or microphone jack (not specifically shown) of the computer system 300, audio signals bound being transmitted to a speaker or headphone jack (not specifically shown) of the computer system 300, or video or other image-bearing signals originating at a camera or video input jack (not specifically shown) or for display on an external (e.g., a separate monitor) or internal (e.g., a laptop or palmtop computer display) display device (not specifically shown). In some embodiments, the call capture agent 360 creates so-called 'virtual' loopbacks in cooperation with the processor 301 and/or with one or more of the support circuits 303 (e.g., a dedicated sound card or video card), as discussed more fully below. Other preparations at the step 408 for capturing a call are possible. When such preparations are complete (e.g., the call capture agent 360 is prepared to begin looping back signals corresponding to actual call content), a signal is sent at a step 409 to the call archive administration service 250 that the call capture agent 360 is "ready" for call capture. In some embodiments, the call capture agent 360 also transmits some local information related to the call (e.g., start and end times of the call, parties thereto, subject matter discussed, account information, etc.) to the call archive administration service 250 at the step 409 for archiving as appropriate.

At step 410, the call capture agent 360 monitors for receipt of a signal from the call archive administration service 250 commanding the call capture agent 360 to 'begin call capture' of a call terminating at the device 106. At step 412, a determination is made whether such a 'begin call capture' signal has been received from the call archive administration service 250. If not, the method 400 returns to the step 410. If so, the method 400 proceeds to a step 414, at which the call capture agent 360 commences a call capture session. During such call capture, information captured from the call via loopback replication of I/O signals passing within the device 106 is transmitted to the call archive administration server 108 for further processing an/or storage in an archive. In some embodiments, information captured from the call via such loopback replication of I/O signals is transmitted in the form of one or more data streams generated in real time. In some embodiments, such information is transmitted in the form of a discrete packet or data file corresponding to part or all of the content of the call (e.g., and transmitted to the call archive administration server 108 upon call drop or call termination), or in the form of two or more such packets or data files (e.g., created and transmitted sequentially and in quasi-real time to the call archive administration server 108 during the course of the call). In some embodiments, such information can be at least temporarily locally stored or cached in one or more storage elements or memory modules on the device 106. Such information may also be compressed and/or encrypted prior to being transmitted to the call archive administration server 108.

Other functions may also, or alternatively, be performed during the step 414 to carry out the call capture function. For example, the call capture agent 360 can continuously monitor the call so that instances of inactivity, long pauses, noise, call drop, etc., can be detected, and reacted to accordingly. For another example, the call capture agent can maintain two-way communications with the call archive administration server 108 for purposes of exchanging respective 'heart beat' signals therewith (e.g., so that in case the call capture agent 360 hangs, crashes or is otherwise inactivated, the call can be terminated or continued in accordance with a predetermined policy). Such communications can further be used to synchronize with related activities of the call archive administration server 108 to facilitate the transmission, processing, and archive storage of call information.

At step 416, the call capture agent 360 monitors for receipt of a signal from the call archive administration service 250 commanding the call capture agent 360 to 'terminate call capture'. At step 418, a determination is made whether such a 'terminate call capture' signal has been received from the call archive administration service 250. If not, the method 400 returns to the step 416. If so, the method 400 proceeds to a step 420, at which the call capture agent 360 terminates the associated call capture session. For example, the loopbacks formed for purposes of replicating the I/O signals within the device 106 can be eliminated in response to the 'terminate call capture' signal, thereby cutting off the flow of call-related information to the call archive administration service 250. Upon termination of the call capture session, the method 400 ends at a step 422.

The method 400 is susceptible to many useful variations and/or modifications. In some embodiments, one-way or two-way communications between the call capture agent 360 and the call archive administration service 250 can be used to coordinate forming additional I/O signal loopbacks for capturing additional or supplementary call content (e.g., corresponding to new forms of call content arising during the course of the call, such as might be associated with different elements of a multimedia presentation), and/or to disable one or more loopbacks associated with I/O transmission paths no longer in use during a call that is otherwise ongoing. In some embodiments, the method 400 need not necessarily end upon termination of the call capture session, but can be continued by reverting back to the step 404. In some such embodiments, the call capture agent 360 can operate continuously on the device in the form of a background utility or tool, monitoring for an appropriate signals from the call archive administration service 250 to begin and end a series of call capture sessions as the need arises. Also, or alternatively, the method 400 can include receiving a signal from the call archive administration service 250 commanding the call capture agent 360 to self-terminate or go dormant (e.g., in which case an additional step can be added to the method 400 prior to the step 404 during which the call capture agent 360 is reactivated). Other variations and/or modifications are possible.

Figure 5A:
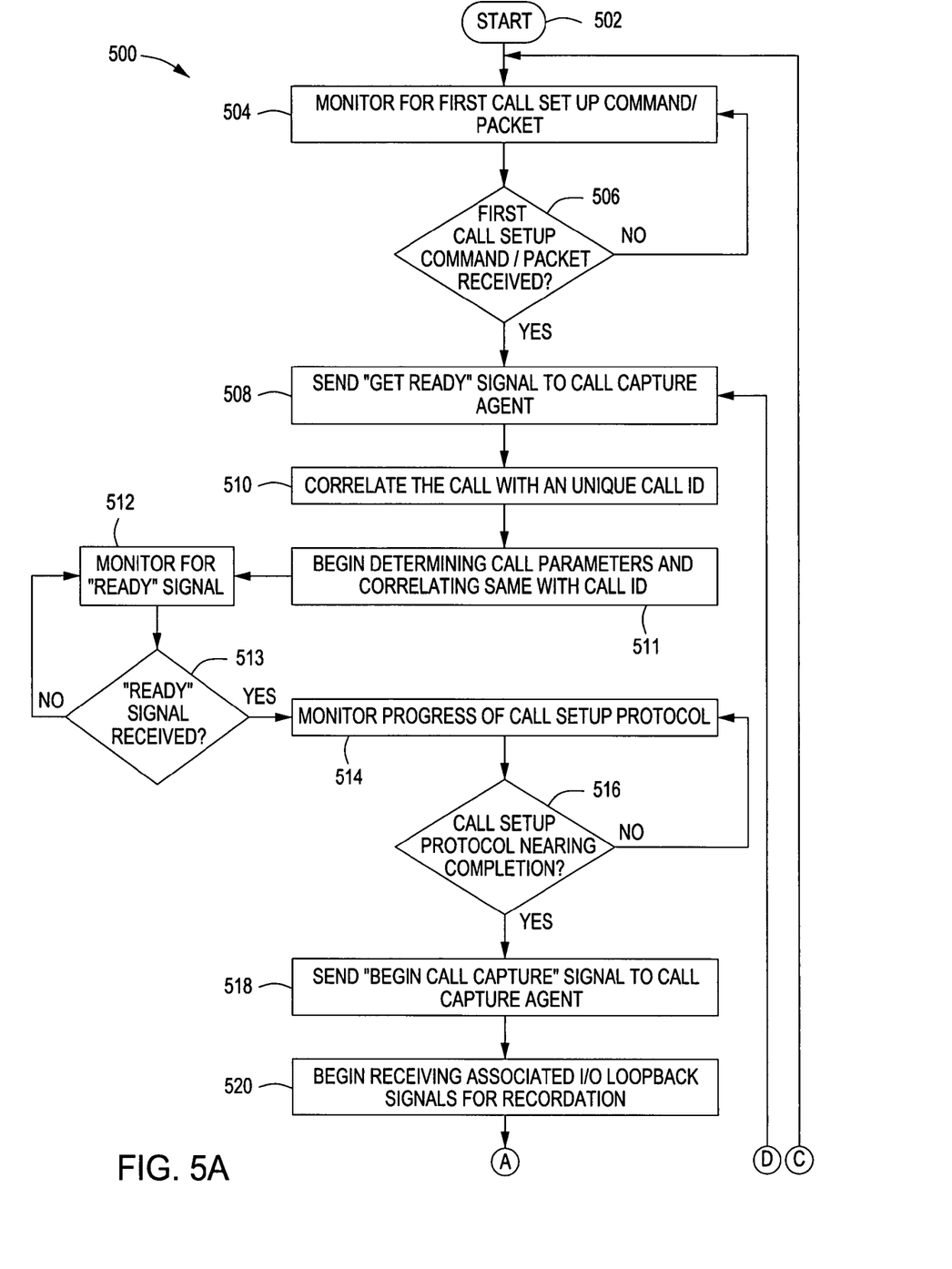
FIGS. 5A, 5B, and 5C, taken together, include a flow diagram depicting an exemplary embodiment of a method for receiving and archiving call information in accordance with one or more aspects of the invention.
Figure 5B:
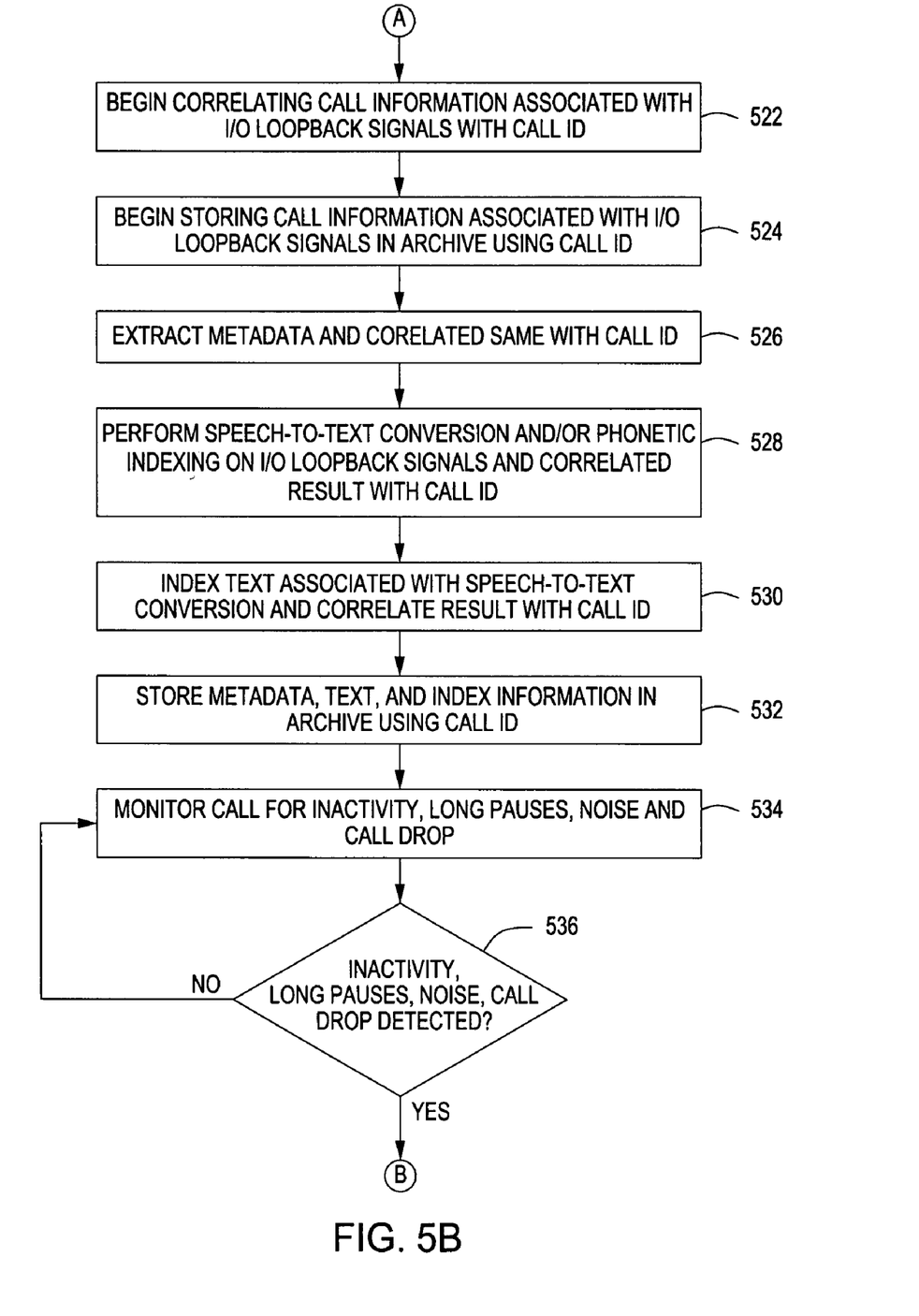
Figure 5C:
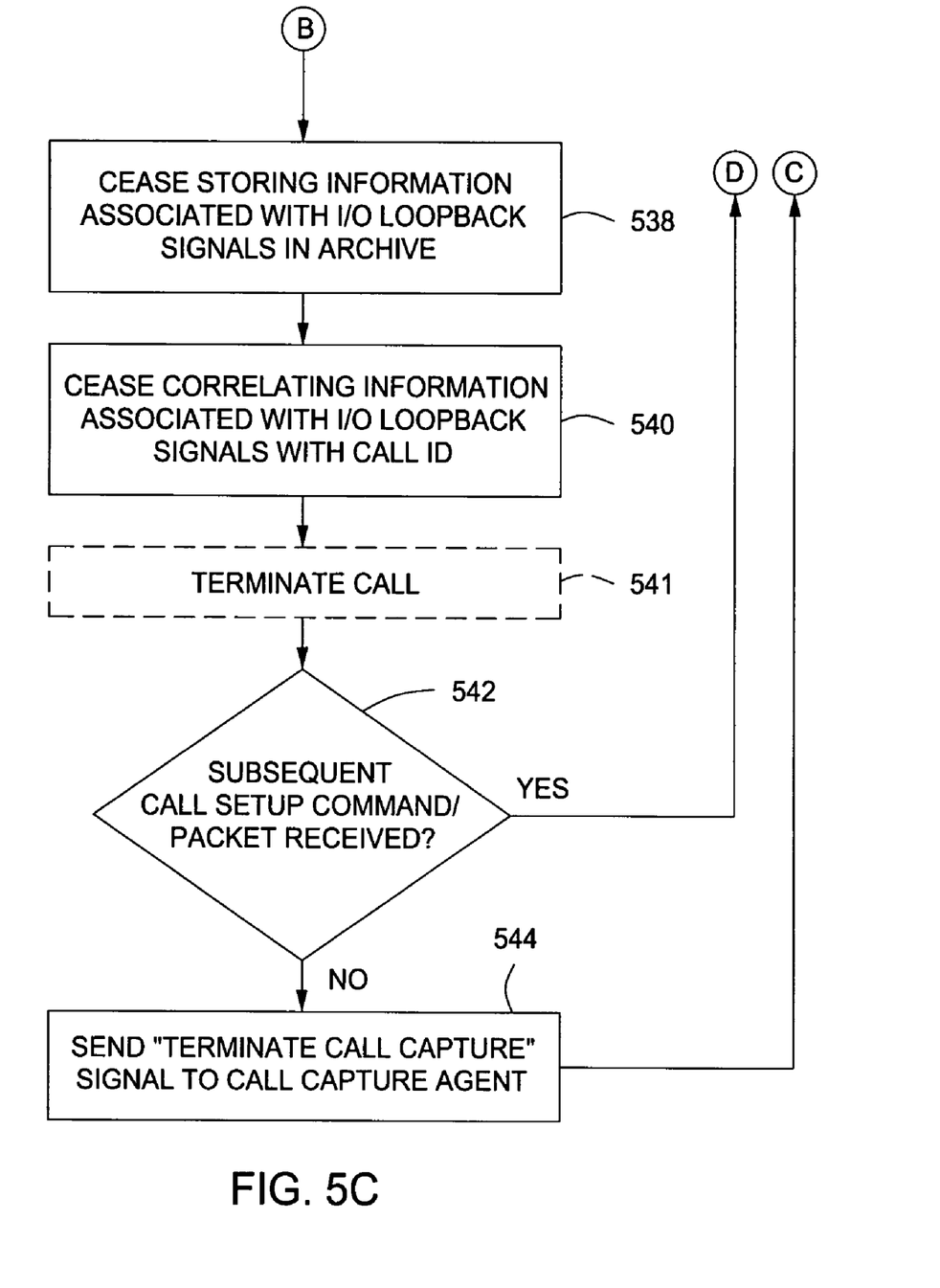

FIGS. 5A, 5B, and 5C, taken together, include a flow diagram depicting an exemplary embodiment of a method 500 for archiving calls terminating at client devices in accordance with one or more aspects of the invention. The method 500 may be performed by the call archive administration service 250 of FIG. 2 to archive calls terminating at the computer system 300 and the enterprise device 106 in the call archive 112. The method 500 may be used and/or altered to archive calls other than, or in addition to, voice calls, e.g., calls including not only a voice or audio content component (e.g., such as may be associated with a speaker or speaker jack output signal or a microphone or microphone jack signal), but also an image or video content component (e.g., such as may be associated with a monitor output signal or a camera input signal). Calls including additional analog or digital content components, including components corresponding to digital information passed between call participants or considered by the call participants during the course of the call, such as slides, presentations, or documents displayed on a monitor or television, can also be archived. Other call components can also, or alternatively, be archived by the method 500.

The method 500 begins at a step 502. At step 504, the call archive administration service 250 monitors for a setup command having been received into the enterprise network 104 corresponding to a first call to be terminated at the device 106. Such a setup command is typically defined in accordance with the protocol used to establish the call. An exemplary call protocol is the Session Initiation Protocol (SIP), and an exemplary setup command is a SIP INVITE message. It is to be understood that other protocols may be used, each having its own call setup message, as is known in the art.

At step 506, a determination is made whether such first call setup command has been so received. If not, the method 500 returns to the step 504. If so, the method 500 proceeds to a step 508, at which an initialization signal is sent to the call capture agent 360 resident on the computer system 300. The initialization signal instructs the call capture agent 360 to initialize for a call capture session (i.e., to "get ready"). The call setup protocol (e.g., SIP) corresponding to the first call proceeds without interruption or interference. At step 510, the first call is correlated with an unique call identifier or call ID. At step 511, call parameters are determined and correlated with the call ID.

At a step 512, the call archive administration service 250 monitors for receipt of a signal from the call capture agent 360 indicating that it has completed all necessary preparations and is "ready" to begin a call capture session. At step 513, a determination is made whether such a "ready" signal has been received from the call capture agent 360. If not, the method 500 returns to the step 512. If so, the method proceeds to a step 514.

At the step 514, the setup protocol for the first call is monitored for progress. At step 516, it is determined whether the setup protocol for the first call is near enough to its completion to begin a related call capture session at the device 106. "Near enough" to completion encompasses that the call session has been established, but call content has not been exchanged. For example, if the call uses the SIP protocol, receipt of the INVITE message and sending an ACK message (acknowledge) indicates that a session has been established and thus a capture session can be initiated. If the setup protocol has not so completed, the method 500 returns to the step 514. Otherwise, the method 500 proceeds to a step 518, at which a signal is sent to the call capture agent 360 to "begin call capture" (e.g., to begin a call capture session). The call capture agent 360 having previously been prepared for the call capture session, the call archive administration service 250 begins, at a step 520, receiving I/O loopback signals associated with the call from the call capture agent 360 for further processing and archive storage.

At step 522, call information associated with the I/O loopback signals is correlated with the call ID. At step 524, call information associated with the I/O loopback signals is stored in the call archive 112 using the call ID. In some embodiments, some or all of the previously determined call parameters associated with the call can further be stored in the call archive 112 at the step 524 using the call ID. At step 526, metadata is extracted from the I/O loopback signals and is correlated with the call ID. At step 528, a speech-to-text conversion is performed on the I/O loopback signals and the result is correlated with the call ID. Alternatively or in addition to speech-to-text conversion, phonetic indexing may be performed on the I/O loopback signals. At step 530, the text associated with the speech-to-text conversion result is indexed and the indexing result is correlated with the call ID.

At step 532, such metadata, text and indexing information is stored in the call archive 112 using the call ID. Also in the step 532, and/or at one or more other steps (e.g., at the step 524), in accordance with some embodiments, the call archive administration service 250 stores such local information about the call as it has determined, or as it has received from the call capture agent 360 (see step 409 as shown and described above) in the call archive 112 using the call ID. At step 534, the call is monitored for any one or more, or all, of such events as inactivity, inordinately long pauses, undue noise, unintended call drop, and intentional call termination. In particular, a heartbeat signal from the agent may be monitored. If the heartbeat signal is absent (i.e., a heartbeat is not received after a predefined duration has elapsed), an event is generated. The event may have various causes, for example, the agent may cease to function, the user may have accidentally terminated the agent, the user may have intentionally (or maliciously) terminated the agent, or the like. At step 536, it is determined whether any of such events has occurred. If not, the method 500 returns to the step 534. If so, the method 500 proceeds to a step 538.

At step 538, storage in the call archive 112 of information associated with I/O loopback signals from the device 106 ceases. Similarly, at a step 540, correlation of information associated with the I/O loopback signals from the device 106 with the call ID also ceases. At step 541, the call may be terminated. For example, if a heartbeat signal is not received from the agent and an event is generated at step 534, the call may be terminated. Call termination can be based on a policy decision that calls are not allowed if they cannot be recorded and archived. This will prevent a user from mistakenly or intentionally terminating the agent and continuing with the call. At step 542, it is determined whether a call setup command associated with a subsequent call has been received at the network 104 of the enterprise 102. If not, the method 500 proceeds to a step 544, at which the call capture agent is sent a signal commanding it to "terminate call capture" (e.g., to conclude the present call capture session), and then returns to the step 504 for further monitoring for future call set up commands or packets. If so, the method 500 returns to step 510 and repeats.

The method 500 is susceptible to many useful variations and modifications. For example, in some embodiments, the call archive administration service 250 is resident on the device 106, as opposed to a separate server. In some embodiments, the call archive administration service 250 and/or the call capture agent 360 monitors for new call content appearing on different I/O signal channels and act to capture and archive such call content as necessary (see related discussion above with reference to FIG. 4). In some embodiments, rather than functioning as a background service or appliance monitoring for call setup commands or packets appearing in the network 104, the call archive administration service 250 can be manually activated by a user of the device (e.g., via the device 106, via the telephone, etc.). One or both of the steps 512 and 513 can be forgone, or modified such that a signal that indicates a failure in call capture session preparation has occurred. One or more of the steps 526, 528, 530, or 532 can further be omitted. Additionally, the methods 400 and 500 can be implemented to archive calls placed via VOIP (Voice Over Internet Protocol), e.g., provided the endpoint devices or phones are sufficiently well equipped to provide the needed functionality.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While, for the purposes of disclosure there have been shown and described what are considered at present to be illustrative, example embodiments of the present invention; it will be appreciated by those skilled in the art that other uses can be resorted to and changes can be made to the example embodiment details or characteristics without departing from the spirit and scope of the invention. The fact that any illustrative list is present in this disclosure does not intend a limitation on the present invention to those items listed. It is therefore desired that the invention not be limited to these embodiments and it is intended that the appended claims cover all such modifications as fall within this spirit and scope.

While the foregoing is directed to embodiments of the present invention, other and further embodiments of the invention can be devised without departing from the basic scope thereof, and the scope thereof is determined by the claims that follow.

The invention claimed is:

1. A method comprising:
   intercepting a command associated with a protocol, wherein the command is configured to set up a call between a client device and another device, and the call comprises at least one of an outbound call content originating at the client device, or an inbound call content originating at the another device;
   associating the call with a call identifier in response to the intercepting of the command;
   in response to the intercepting of the command, monitoring a progress of the protocol toward the set up of the call;
   in response to the intercepting of the command, instructing an agent resident on the client device to perform replication of at least one of
      a first signal associated with the outbound call content as a replicated first signal, or
      a second signal associated with the inbound call content as a replicated second signal, wherein the instructing the agent to perform the replication comprises:
   instructing the agent to perform the replication in response to the monitoring the progress indicating the set up of the call being near enough completed; and
   storing at least one of the replicated first signal or the replicated second signal in an archive using the call identifier.

2. An apparatus comprising:
   means for intercepting a command associated with a protocol, wherein the command is for setting up a call between a client device and another device, the call comprises at least one of
   an outbound call content originating at the client device, or
   an inbound call content originating at the another device;
   means for associating the call with a call identifier in response to the intercepting of the command;

means for monitoring, in response to the intercepting of the command, a progress of the protocol toward the set up of the call;

means for instructing, in response to the intercepting of the command, an agent resident on the client device to perform replication of at least one of a first signal associated with the outbound call content as a replicated first signal, or a second signal associated with the inbound call content as a replicated second signal, wherein the means for instructing the agent to perform the replication comprises:

means for instructing the agent to perform the replication in response to the monitoring the progress indicating the set up of the call being near enough completed; and means for storing at least one of the replicated first signal or the replicated second signal in an archive using the call identifier.

3. A system comprising:

an agent resident on the client device, wherein the agent is configured to replicate at least one of a first signal associated with an outbound call content of a call as a replicated first signal, or a second signal associated with an inbound call content of the call as a replicated second signal, the agent is further configured to perform the replication by forming one or more loopbacks, the agent is further configured to perform the replication in response to receiving replication instructions; and a call archive administration service configured to for intercept command associated with a protocol, wherein the command is for setting up the call, the call archive administration service is configured to associate the call with a call identifier in response to the interception, monitor a progress of the protocol toward the set up of the call in response to the interception, control the replication by the call capture agent, wherein the call archive administration service is configured to control the replication by instructing the agent to perform the replication, and the call archive administration service is configured to instruct the agent to perform the replication in response to the monitoring of the progress indicating that the setup of the call is near enough completed, and store at least one of the replicated first signal or the replicated second signal in an archive using the call identifier.

4. The method of claim 1, further comprising receiving, from the agent, at least one of the replicated first signal or the replicated second signal, wherein the receiving is performed prior to the storing.

5. The method of claim 1, further comprising:

in response to the intercepting of the command, instructing the agent to perform a preparation for the replication, wherein the instructing the agent to perform the preparation is performed prior to the instructing the agent to perform the replication.

6. The method of claim 5, further comprising:

receiving local information associated with the call from the agent, and storing the local information associated with the call in the archive using the call identifier.

7. The method of claim 5, further comprising: receiving notice from the agent of a completion of the preparation before the instructing the agent to perform the replication.

8. The method of claim 5, wherein the preparation comprises:

forming one or more loopbacks, wherein the one or more loopbacks are configured to facilitate the replicating.

9. The method of claim 1, wherein the replication is performed using one or more loopbacks formed at the client device.

10. The method of claim 9, wherein the one or more loopbacks comprise one or more virtual loopbacks.

11. The method of claim 9, further comprising:

responding to the intercepting by instructing the agent to form the one or more loopbacks.

12. The method of claim 11, further comprising:

causing the agent to form the one or more loopbacks in advance of a completion of the set up of the call.

13. The method of claim 1, wherein each of the inbound call content and the outbound call content includes an audio content component, the first signal comprises the audio content component of the outbound call content, and the second signal comprises the audio content component of the inbound call content.

14. The method of claim 1, wherein each of the inbound call content and the outbound call content includes a video content component, the first signal includes the video content component of the outbound call content, and the second signal includes the video content component of the inbound call content.

15. The method of claim 1, wherein each of the inbound call content and the outbound call content includes an audio content component, and the method further comprises:

performing a speech-to-text conversion of at least one of the audio content component of the inbound call content or the outbound call content, and storing a result of the speech-to-text conversion in the archive using the call identifier.

16. The method of claim 15, further comprising:

indexing a result of the speech to text conversion, and storing a result of the indexing in the archive using the call identifier.

17. The method of claim 1, wherein each of the inbound call content and the outbound call content includes an audio content component, and the method further comprises:

performing a phonetic indexing of at least one of the audio content component of the inbound call content or the outbound call content, and storing a result of the phonetic indexing in the archive using the call identifier.

18. The method of claim 1, wherein at least one of the inbound call content and the outbound call content includes a metadata component, and the method further comprises:

extracting the metadata component, and storing a result of the metadata extraction in the archive using the call identifier.

19. The method of claim 1, further comprising:

monitoring a heartbeat signal from an agent resident on the client device; and terminating the call in response to the monitoring indicating an absence of the heartbeat signal.

20. The apparatus of claim 2, further comprising means for instructing the agent to begin a preparation for the replication.

21. The apparatus of claim 2, further comprising means for instructing the agent to form one or more loopbacks, wherein the one or more loopbacks are configured to facilitate the replication of the at least one of the first signal or the second signal.

* * * * *